June 26, 1962  P. H. G. VAN VLODROP  3,041,500
CIRCUIT ARRANGEMENT FOR CONTROLLING GAS- OR
VAPOUR-FILLED DISCHARGE VALVES
WITH THE AID OF A CAPACITOR
Filed Dec. 9, 1959

INVENTOR
P.H.G. VAN VLODROP
BY
AGENT

United States Patent Office 3,041,500
Patented June 26, 1962

3,041,500
CIRCUIT ARRANGEMENT FOR CONTROLLING GAS- OR VAPOUR-FILLED DISCHARGE VALVES WITH THE AID OF A CAPACITOR
Peter Hubertus Gerardus van Vlodrop, Eindhoven, Netherlands, assignor to North American Philips Company Inc., New York, N.Y., a corporation of Delaware
Filed Dec. 9, 1959, Ser. No. 858,342
Claims priority, application Netherlands Dec. 16, 1958
4 Claims. (Cl. 315—168)

The invention relates to a circuit arrangement for controlling a gas- or vapour-filled discharge valve with the aid of a capacitor, which is charged via a rectifier from an alternating-voltage source and is discharged via a resistor, of which at least part is included in the control-grid circuit of the discharge valve so that the grid potential is negative. Such an arrangement has been proposed in my prior application, Serial No. 636,607, filed January 28, 1957, jointly with Hajo Lorens van der Horst, entitled "Control Circuit Arrangement," which issued October 11, 1960, as Patent 2,956,207, and is assigned to the same assignee of the present application. By means of an adjustable tapping on the said resistor or a variable positive grid bias voltage the instant of ignition of the discharge valve can be controlled.

In accordance with the invention the anode voltage of the discharge valve of the arrangement of the said type is obtained from a second capacitor which is charged periodically via a rectifier by an alternating-voltage source so that the second capacitor is charged in a time interval during which the discharge valve is cut off by the grid voltage, whilst the anode circuit of the valve includes an impedance, from which a control-voltage pulse can be derived at the discharge of the second capacitor.

Such an arrangement has various advantages.

The output pulse, which may be used for controlling a further device, has a constant value in the control-range.

The available control-range may be up to 230°.

During each period of the alternating voltage a control-pulse can be supplied.

The invention will be described more fully with reference to the accompanying, diagrammatic drawing.

Figure 1:
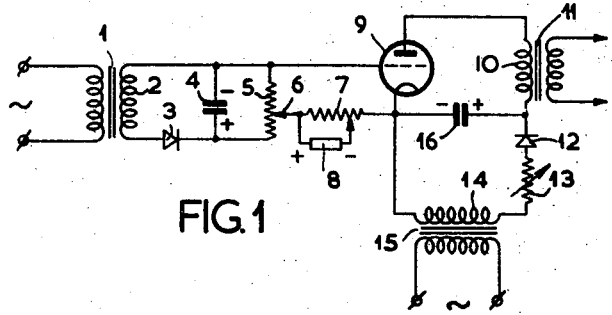
Figure 2:
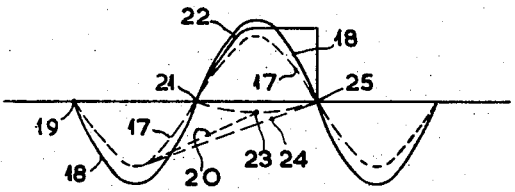
Figure 3:
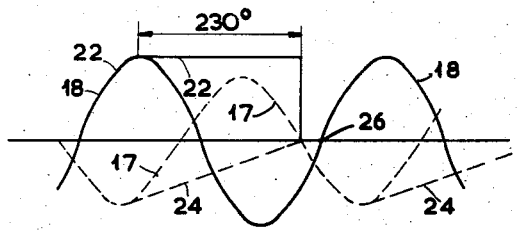

FIG. 1 shows a circuit arrangement according to the invention and FIGS. 2 and 3 illustrate various control-methods.

Referring to FIG. 1, a transformer 1 is connected to an alternating-voltage source. The secondary winding 2 charges, via a rectifier 3, a capacitor 4. A resistor 5, connected in parallel herewith, and having an adjustable tapping 6, is included, together with variable resistor 7, which is fed from a direct-voltage source 8, in the grid circuit of the gas- or vapour-filled discharge valve 9.

The anode circuit of this valve includes the primary winding 10 of an output transformer 11, a rectifier 12, a variable resistor 13 (which, in principle, may be omitted) and the secondary winding 14 of a transformer 15, which is connected to the aforesaid alternating-voltage source. A capacitor 16 can be charged via the resistor 13 and the rectifier 12 from the winding 14. The alternating voltages across the windings 2 and 14 are in co-phase.

FIG. 2 shows, in broken lines, the alternating voltage across the winding 2, designated by 17, and that across the winding 14, designated by 18. At the instant 19 the capacitor 4 is charged and is slowly discharged, via the resistor 5, after the termination of the charge, as is indicated by the line 20. At the instant 21 the capacitor 16 starts to charge along the line 22 in a time interval in which the valve 9 is cut off by the negative voltage at the resistor 5 (see line 20 of FIG. 2). If at the instant 23 the line 20 intersects the ignition characteristic curve, illustrated therein as an arcuate dash line, of the valve 9, the valve 9 will ignite at this instant and the capacitor 16 will be discharged, not shown in FIG. 2, across the winding, so that the transformer 11 delivers a control-pulse. If the discharge of the capacitor 4 is less abrupt, as is indicated by 24 in FIG. 2, the ignition will take place not until the instant 25 at which time the capacitor 16 is discharged as illustrated by the solid vertical line of the termination of curve 22.

Referring to FIG. 3, the alternating voltages 17 and 18 are not in cophase. The voltage 18 leads by about 140° with respect to the voltage 17, which may be achieved in known manner by phase-shifting means. It is thus possible to obtain a control-range of about 230°. A leading in time of more than 140° may give rise to difficulties, since the control-voltage at the valve 9 is required to be adequately negative at the start of the charge of the capacitor 16 at point 26.

In the arrangement shown in FIG. 3 the resistor 13 of FIG. 1 is supposed to be omitted.

What is claimed is:

1. An electrical circuit arrangement comprising a gas filled electric discharge device having a cathode, an anode and a control electrode, a control circuit connected to said control electrode and comprising first input means for an alternating current of given frequency value, a first capacitor, means for charging said capacitor comprising a first rectifier connected to said input means, a resistor element shunting said capacitor, said resistor element having a value at which said capacitor is substantially discharged within the interval of one period of said alternating current, an output circuit connected to said anode and comprising second input means for an alternating current of said given frequency value and having a predetermined phase relationship with the alternating signal of said first input means, an energy storage circuit for said anode comprising a second capacitor and second rectifier means connected between said second capacitor and said second input means, and a load impedance interposed between said second capacitor and said anode, said energy storage circuit having a charging time interval at which said second capacitor is substantially fully charged during the discharge period of said first capacitor.

2. An electrical circuit arrangement comprising a gas filled electric discharge device having a cathode, an anode and a control electrode, a control circuit connected to said control electrode and comprising first input means for an alternating current of given frequency value, a first capacitor, means for charging said capacitor comprising a first rectifier connected to said input means, a resistor element shunting said capacitor, said resistor element having a value at which said capacitor is substantially discharged within the interval of one period of said alternating current, an output circuit connected to said anode and comprising second input means for an alternating current of said given frequency value and having a predetermined phase relationship with the alternating signal of said first input means, an energy storage circuit for said anode comprising a second capacitor and second rectifier means connected between said second capacitor and said second input means, and a load impedance interposed between said second capacitor and said anode, said energy storage circuit having a charging time interval at which said second capacitor is substantially fully charged during the discharge period of said first capacitor, and having a discharging time interval at which said second capacitor is substantially fully discharged during the conduction period of said electric discharge device.

3. An electrical circuit arrangement comprising a gas filled electric discharge device having a cathode, an anode and a control electrode, a control circuit connected to said control electrode and comprising first input means for an alternating current of given frequency value, a first capacitor, means for charging said capacitor comprising a first rectifier connected to said input means, a resistor element shunting said capacitor, said resistor element having a value at which said capacitor is substantially discharged within the interval of one period of said alternating current, an output circuit connected to said anode and comprising second input means for an alternating current of said given frequency value, an energy storage circuit for said anode comprising a second capacitor and second rectifier means connected between said second capacitor and said second input means, the alternating current of said first and second input means being substantially in phase, and a load impedance interposed between said second capacitor and said anode, said energy storage circuit having a charging time interval at which said second capacitor is substantially fully charged during the discharge period of said first capacitor.

4. An electrical circuit arrangement comprising a gas filled electric discharge device having a cathode, an anode and a control electrode, a control circuit connected to said control electrode and comprising first input means for an alternating current of given frequency value, a first capacitor, means for charging said capacitor comprising a first rectifier connected to said input means, a resistor element shunting said capacitor, said resistor element having a value at which said capacitor is substantially discharged within the interval of one period of said alternating current, an output circuit connected to said anode and comprising second input means for an alternating current of said given frequency value, an energy storage circuit for said anode comprising a second capacitor and second rectifier means connected between said second capacitor and said second input means, the alternating current of said second input means having a leading phase relationship to the alternating current of said first input means, and a load impedance interposed between said second capacitor and said anode, said energy storage circuit having a charging time interval at which said second capacitor is substantially fully charged during the discharge period of said first capacitor.

References Cited in the file of this patent

UNITED STATES PATENTS

| | | |
|---|---|---|
| 2,341,541 | Grier | Feb. 15, 1944 |
| 2,402,608 | Klemperer | June 25, 1946 |
| 2,494,747 | Drugman | Jan. 17, 1950 |
| 2,508,973 | Smith | May 23, 1950 |
| 2,697,802 | Decker | Dec. 21, 1954 |

FOREIGN PATENTS

| | | |
|---|---|---|
| 1,167,145 | France | July 7, 1958 |

OTHER REFERENCES

Precision Energy-Storage Spot Welder, Rufus Briggs et al., Electronics, June 1947, pages 102, 103 and 104.